US007149860B2

(12) United States Patent
Nonaka et al.

(10) Patent No.: US 7,149,860 B2
(45) Date of Patent: Dec. 12, 2006

(54) REMOTE COPY WITH WORM GUARANTEE (75) Inventors: Yusuke Nonaka, Yokohama (JP);
Naoto Matsunami, Hayamamachi (JP);
Akira Nishimoto, Sagamihara (JP);
Yoichi Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 10/883,753

(22) Filed: Jul. 6, 2004

(65) Prior Publication Data
US 2005/0268055 A1 Dec. 1, 2005

(30) Foreign Application Priority Data
May 27, 2004 (JP) ............................. 2004-157034

(51) Int. Cl.
*G06F 12/14* (2006.01)

(52) U.S. Cl. .......................... 711/162; 711/163; 360/60

(58) Field of Classification Search ........ 711/161–163; 360/60
See application file for complete search history.

(56) References Cited

U.S. PATENT DOCUMENTS

| 5,592,618 | A | 1/1997 | Micka et al. |
| 5,680,640 | A | 10/1997 | Ofek et al. |
| 5,742,792 | A | 4/1998 | Yanai et al. |
| 5,751,997 | A | 5/1998 | Kullick et al. |
| 5,787,485 | A | 7/1998 | Fitzgerald et al. |
| 5,889,935 | A | 3/1999 | Ofek et al. |
| 5,940,841 | A | 8/1999 | Schmuck et al. |
| 6,145,066 | A | 11/2000 | Atkin |
| 6,240,494 | B1 | 5/2001 | Nagasawa et al. |
| 6,304,980 | B1 | 10/2001 | Beardsley et al. |
| 6,467,034 | B1 | 10/2002 | Yanaka |
| 6,526,419 | B1 * | 2/2003 | Burton et al. ............... 707/204 |
| 6,530,003 | B1 | 3/2003 | Bakke et al. |
| 6,681,303 | B1 | 1/2004 | Watanabe et al. |
| 6,728,848 | B1 | 4/2004 | Tamura et al. |
| 6,766,430 | B1 | 7/2004 | Arakawa et al. |
| 6,772,306 | B1 | 8/2004 | Suzuki et al. |

(Continued)

FOREIGN PATENT DOCUMENTS

EP 0617362 9/1994

(Continued)

OTHER PUBLICATIONS

"Hitachi LDEV Guard".

(Continued)

*Primary Examiner*—Hong Chong Kim
*Assistant Examiner*—Hetul Patel
(74) *Attorney, Agent, or Firm*—Mattingly, Stanger, Malur & Brundidge, P.C.

(57) ABSTRACT

In the case in which data in a storage system A is remotely copied to a storage system B, it is not taken into account whether the data of the remote copy is WORM data. In the case in which a setting is made such that data stored in a volume in the storage system A is copied to a volume in the storage system B, storage system A judges whether an attribute to the effect that data can be referred to and can be updated or to the effect that data can be referred to but cannot be updated is added to the volume in the storage system A. Then, if the volume is a volume to which the attribute to the effect that data can be referred to but cannot be updated is added, such attribute is added to the volume in the storage system B.

20 Claims, 8 Drawing Sheets

U.S. PATENT DOCUMENTS

| | | |
|---|---|---|
| 6,772,309 B1 | 8/2004 | Ohr et al. |
| 6,889,376 B1 | 5/2005 | Barritz et al. |
| 2002/0016827 A1 | 2/2002 | McCabe et al. |
| 2002/0152231 A1 | 10/2002 | Silva-Craig et al. |
| 2003/0079083 A1 | 4/2003 | Lubbers et al. |
| 2003/0126107 A1 | 7/2003 | Yamagami |
| 2003/0177321 A1 | 9/2003 | Watanabe |
| 2003/0212854 A1 | 11/2003 | Kitamura et al. |
| 2003/0229764 A1 | 12/2003 | Ohno et al. |
| 2004/0049553 A1 | 3/2004 | Iwamura et al. |
| 2004/0133756 A1 | 7/2004 | Shaw et al. |
| 2004/0143832 A1 | 7/2004 | Yamamoto et al. |
| 2005/0010609 A1 | 1/2005 | Katoh et al. |
| 2005/0182900 A1 | 8/2005 | Matsunami et al. |

FOREIGN PATENT DOCUMENTS

| | | |
|---|---|---|
| JP | 03-003159 | 1/1991 |
| JP | 11-305947 | 11/1999 |
| JP | 2000-305856 | 11/2000 |
| WO | 97/09676 | 3/1997 |

OTHER PUBLICATIONS

"Symantec Client Migration—Secure and Effective PC Data and Desktop Settings Migration", 6/04, Symantec Corp.

"Automating Storage and Data Resource Management With the Arkivio™ Auto-Stor Software" An Arkivio™ Technical White Paper, 2002, pp. 1-14.

* cited by examiner

VOLUME MANAGEMENT TABLE A

| VOLUME NUMBER | CAPACITY | I/O CONTROL TYPE | WORM UNIT | REMOTE COPY ATTRIBUTE | REMOTE COPY STATE |
|---|---|---|---|---|---|
| 1 | 50GB | NORMAL |  | NONE | NONE |
| 2 | 100GB | WORM | FILE | PRIMARY | PAIR |
| 3 | 80GB | NORMAL |  | PRIMARY | COMMUNICATION ERROR |
| 4 | 120GB | WORM | SECTOR | SECONDARY | DIVISION |
| 5 | 40GB | NORMAL |  | SECONDARY | COPYING |
| 6 | 60GB | WORM | VOLUME | PRIMARY | COPYING |

REMOTE COPY WITH WORM GUARANTEE

CROSS-REFERENCES TO RELATED APPLICATIONS

This application relates to and claims priority from Japanese Patent Application No. 2004-157034, filed on 2004/05/27, the entire disclosure of which is incorporated herein by reference.

BACKGROUND OF THE INVENTION

1. Field of the Invention

The present invention relates to a storage system that constitutes a computer system, and in particular, to a remote copy function and a WORM function that the storage system has.

2. Description of the Related Art

The remote copy is a technique for mirroring data among plural storage systems (here, the storage system includes a storage that records data and a control apparatus that controls the storage; this applies in the following description) without the intervention of a host computer. The remote copy will be explained with a case in which a storage system A having a logical volume A(1) and a storage system B having a logical volume B(1) are connected by a network such as a Fibre Channel or an IP or a private line as an example.

By performing the remote copy, contents recorded in the logical volume A(1) and the logical volume B(1) are kept identical. A host computer is connected to the storage system A, refers to or updates data recorded in the logical volume A(1), and sets the logical volume A(1) and the logical volume B(1) as a pair for the remote copy. When the host computer issues a command for updating the data recorded in the logical volume A(1) to the storage system A, the storage system A updates the data recorded in the logical volume A(1) and sends the updated data to the storage system B. The storage system B updates data recorded in the logical volume B(1). In this way, the data recorded in the logical volume A(1) and the data recorded in the logical volume B(1) are kept identical.

The plural storage systems are arranged remote from each other to perform the remote copy, whereby, when a disaster occurs, an operation of the computer system is continued and restored promptly. Moreover, by performing the remote copy, an operation of data recorded in a certain storage system can be transferred to another storage system. As a method of transferring an operation of data recorded in a certain storage system to another storage system, there are a method of stopping a storage system at time decided in advance to transfer an operation of data to another storage system and a method of transferring an operation of data to another storage system without stopping a storage system. Details of the remote copy are disclosed in U.S. Pat. No. 5,742,792.

WORM is the abbreviation of Write Once Read Many, which means a characteristic of data, that is, data which is recorded once, cannot be updated and can only be referred to. Data having the nature of WORM is effective for proving that the data has not been falsified after the data was recorded and preventing deletion of data due to an operation mistake. The data having the nature of WORM will be hereinafter referred to as WORM data. As a method of realizing the WORM data, there are a method of using a recording device having the nature of WORM as a physical nature like a Write Once CD and a method of adding a device or a program for prohibiting update of data to a storage incorporating a magnetic disk or the like that can be updated many times physically. The latter is disclosed in "Hitachi LDEV Guard".

In a conventional technique, in the case in which the data in the storage system A is remotely copied to the storage system B, it is not taken into account whether data to be copied is WORM data. Therefore, for example, when the storage system A breaks down due to a disaster during the remote copy, and an operation of a system has to be continued using the data copied to the storage system B remotely, since the data recorded in the storage system B is not WORM data, falsification of the data is possible, and it cannot be proved that the data has not been falsified after the data was recorded. In addition, the same problem occurs when an operation of data in a storage system is transferred to another storage system in a planned manner.

SUMMARY OF THE INVENTION

Thus, the present invention discloses a system having a remote copy function for WORM data that can copy not only data but also the nature of WORM, that is, can impart the nature of WORM to copy destination data as in copy source data.

In the case in which setting is made such that data stored in a volume in the storage system A is copied to a volume in the storage system B, a first control apparatus in the storage system A judges whether an attribute to the effect that data can be referred to and can be updated or an attribute to the effect that data can be referred to but cannot be updated is added to the volume in the storage system A. Then, if the volume is a volume to which the attribute to the effect that data can be referred to but cannot be updated is added, the first control apparatus instructs a second control apparatus in the storage system B to add the attribute to the effect that data can be referred to but cannot be updated to the volume in the storage system B.

When the remote copy is performed among plural storage systems, not only data but also the nature of WORM can be copied from one storage system to the other storage systems. In other words, the nature of WORM can be imparted to copy destination data as in copy source data.

DESCRIPTION OF THE PREFERRED EMBODIMENTS

An embodiment of the present invention will be hereinafter explained with reference to the accompanying drawings. Note that the present invention is not limited to this embodiment.

Figure 1:
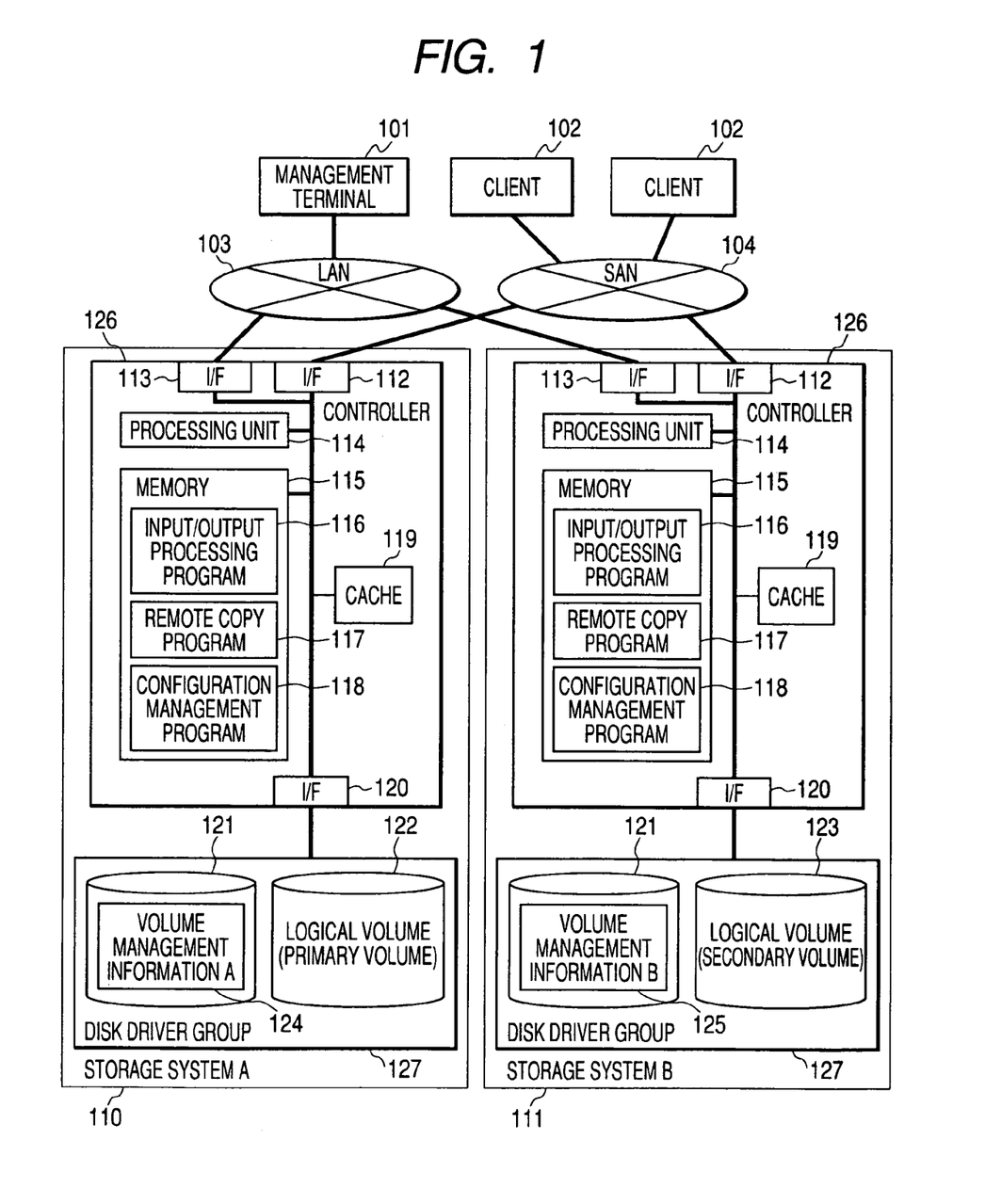
FIG. 1 is a block diagram showing an example of a structure of a system in accordance with the present invention.

FIG. 1 is a block diagram showing an example of a structure of a system to which the present invention is applied.

The system to which the present invention is applied includes: a storage system A 110, a storage system B 111, a management terminal 101; clients 102; a LAN 103 that connects the management terminal 101, the storage system A 110, and the storage system B 111; and a SAN 104 that connects the clients 102, the storage system A 110, and the storage system B 111.

The storage system A 110 has a controller 126 and a disk driver group 127. The storage system A 110 receives I/O requests for a logical volume in the storage system A 110 from the clients 102 connected to the SAN 104.

The storage system B 111 has the same structure as the storage system A 110 and receives I/O requests for a logical volume in the storage system B 111 from the clients 102. In this embodiment, the storage system B 111 is assumed to have the same structure as the storage system A 110. However, the storage system B 111 does not have to be completely the same as the storage system A 110.

The disk driver group 127 has plural hard disks, and the plural hard disks are connected to an I/F 120. A storage area in the disk driver group 127 is divided into plural logical volumes. A logical volume 122 is one of the plural logical volumes. Volume management information A 124, which indicates a correspondence relation and the like between the logical volumes and the hard disks, is recorded in a storage area 121 in the disk driver group 127. In this embodiment, the volume management information A 124 is assumed to be recorded in the storage area 121 in the disk driver group 127. However, the volume management information A 124 may be recorded in flash memory or the like on the controller 126 other than the storage area 121 in the disk driver group 127.

In this embodiment, it is assumed that the volume management information A 124 and the volume management information B 125 record that the logical volume 122 in the storage system A 110 and the logical volume 123 in the storage system B 111 form a remote copy pair, and the logical volume 122 is a primary volume and the logical volume 123 is a secondary volume. Here, the remote copy pair is a set of a copy source and a copy destination of remote copy that are constituted by a primary volume and a secondary volume. The management terminal 101 connected to the LAN 103 designates logical volumes, which constitute the primary volume and the secondary volume, for the storage system A 110 and the storage system B 111, whereby the remote copy pair is set.

The controller 126 includes: a processing unit 114; a memory 115 in which a program to be executed by the processing unit 114 is stored; a cache 119; an I/F 112 that is connected to the SAN 104; an I/F 113 that is connected to the LAN 103; and an I/F 120 that is connected to the disk driver group 127. An input/output processing program 116, a remote copy program 117, and a configuration management program 118 are stored in the memory 115.

The input/output processing program 116 is a program for executing processing for converting an I/O command for a logical volume received from the client 102 into an I/O command for the respective hard disks in the disk driver group 127 using the volume management information.

The configuration management program 118 is a program for executing processing for receiving an instruction for setting of a remote copy pair from the management terminal 101 and setting the remote copy pair. Details of the remote copy pair will be described later.

The remote copy program 117 is a program for executing processing for, when a remote copy pair is set, providing a remote copy function between the set remote copy pair. Here, the remote copy function means a function for, when a remote copy pair is set, copying data stored in a primary volume to a secondary volume, and after the remote copy is set, copying data, which is written in the primary volume according to an instruction from the client 102, to the secondary volume. A write request for the primary volume 122 from the client 102 is executed for the secondary volume 123 in the same manner according to the remote copy function. Therefore, the secondary volume 123 becomes a copy (mirror) of the primary volume 122 that forms the remote copy pair with the secondary volume 123.

Figure 2:
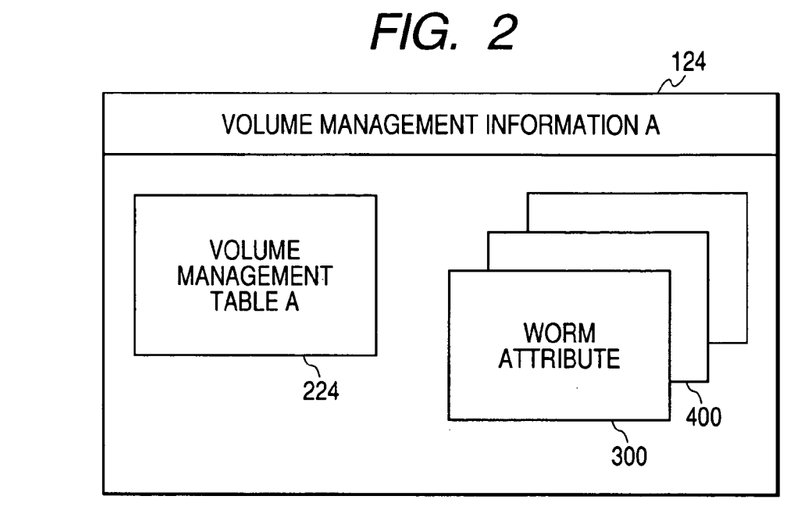
FIG. 2 is a diagram showing an example of volume management information.

FIG. 2 is a diagram showing an example of the volume management information A 124. The volume management information A 124 stores and manages a volume management table A 224 and WORM attributes 300 and 400 that are prepared for each volume corresponding to volumes for which WORM is set. Details concerning the volume management table A 224 and the WORM attributes will be described later. Note that the volume management information A 124 is not limited to the volume management information of this embodiment but may include other information. In addition, in this embodiment, it is assumed that, when WORM is set for a volume, the WORM attribute 300 or 400 corresponding to the volume, for which WORM is set, is prepared according to the configuration management programs of the respective storage systems. However, the WORM attribute 300 or 400 corresponding to all volumes may be prepared in advance.

Figure 3:
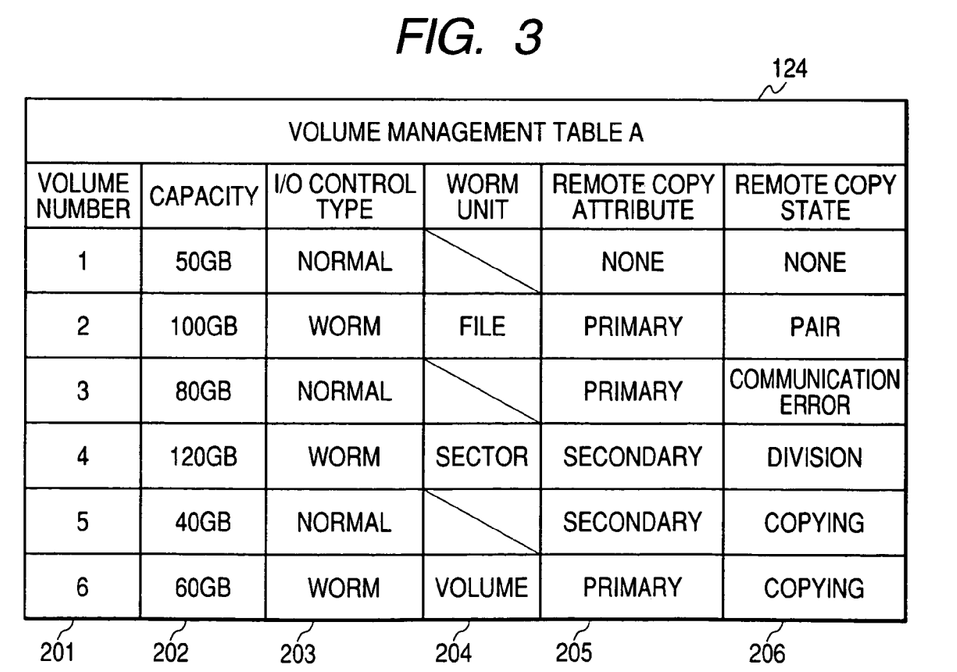
FIG. 3 is a diagram showing an example of a volume management table.

FIG. 3 is a diagram showing an example of the volume management table A 224. The volume management table A 224 stores and manages a volume number 201, a capacity 202, an I/O control type 203, a WORM unit 204, a remote copy attribute 205, and a remote copy state 206.

The volume number 201 indicates the number of a logical volume.

The capacity 202 indicates a storage capacity of a logical volume.

An attribute of normal or WORM is set in the I/O control type 203 by the management terminal 101 or the client 102. The client 102 is capable of referring to and updating all sectors concerning a logical volume for which normal is set in the I/O control type 203. On the other hand, concerning a logical volume for which WORM is set in the I/O control type 203, update of all sectors or specific sectors or files by the client 102 is restricted on the basis of the WORM unit 204 and conditions set in a WORM attribute shown in FIG. 4 or 5.

A unit for restricting update of a logical volume, for which WORM is set, is set in the WORM unit 204 by the management terminal 101 or the client 102. In this embodiment, a file, a sector, and a volume are described as examples of the unit. However, any unit can be applied as the WORM unit 204 as long as the unit designates a specific part of a logical volume. In the case in which a volume is set as the WORM unit 204, update for all sectors of the volume is prohibited. In the case in which a sector is set as the WORM unit 204, update for a sector, which is set as an update prohibited area in the WORM attribute 300, is prohibited. In the case in which a file is set as the WORM unit 204, update for a file, which is set as an update prohibited file in the WORM attribute 400, corresponding to the volume is prohibited. However, in the case in which a file is designated as the WORM unit 204, the storage system A 110 and the storage system B 111 in FIG. 1 should have a file server function, or a file server, which communicates with the storage system A 110 and the storage system B 111, should be present on the SAN 104.

The remote copy attribute 205 indicates whether the logical volume constitutes a remote copy pair. If the logical volume constitutes a remote copy pair, it is recorded in the remote copy attribute 205 whether the logical volume is a primary volume or a secondary volume. Note that, although not shown in the figure, if the logical volume constitutes a remote copy pair, the remote copy attribute 205 also includes additional information such as a volume number of the other logical volume forming the remote copy pair and an identification (ID) of a storage including the logical volume. As the identification (ID) of the storage, there is, for example, a World Wide Name (WWN) or the like of the Fibre Channel standard. Here, a remote copy pair, in which both a primary volume and a secondary volume have the attribute of WORM, is called a WORM remote copy pair. By forming the WORM remote copy pair, the attribute of WORM of the primary volume can be transferred to the secondary volume.

If the logical volume constitutes a remote copy pair, a state of remote copy is recorded in the remote copy state 206. A type and transition of a state will be described later in conjunction with an explanation of FIG. 7.

Figure 4:
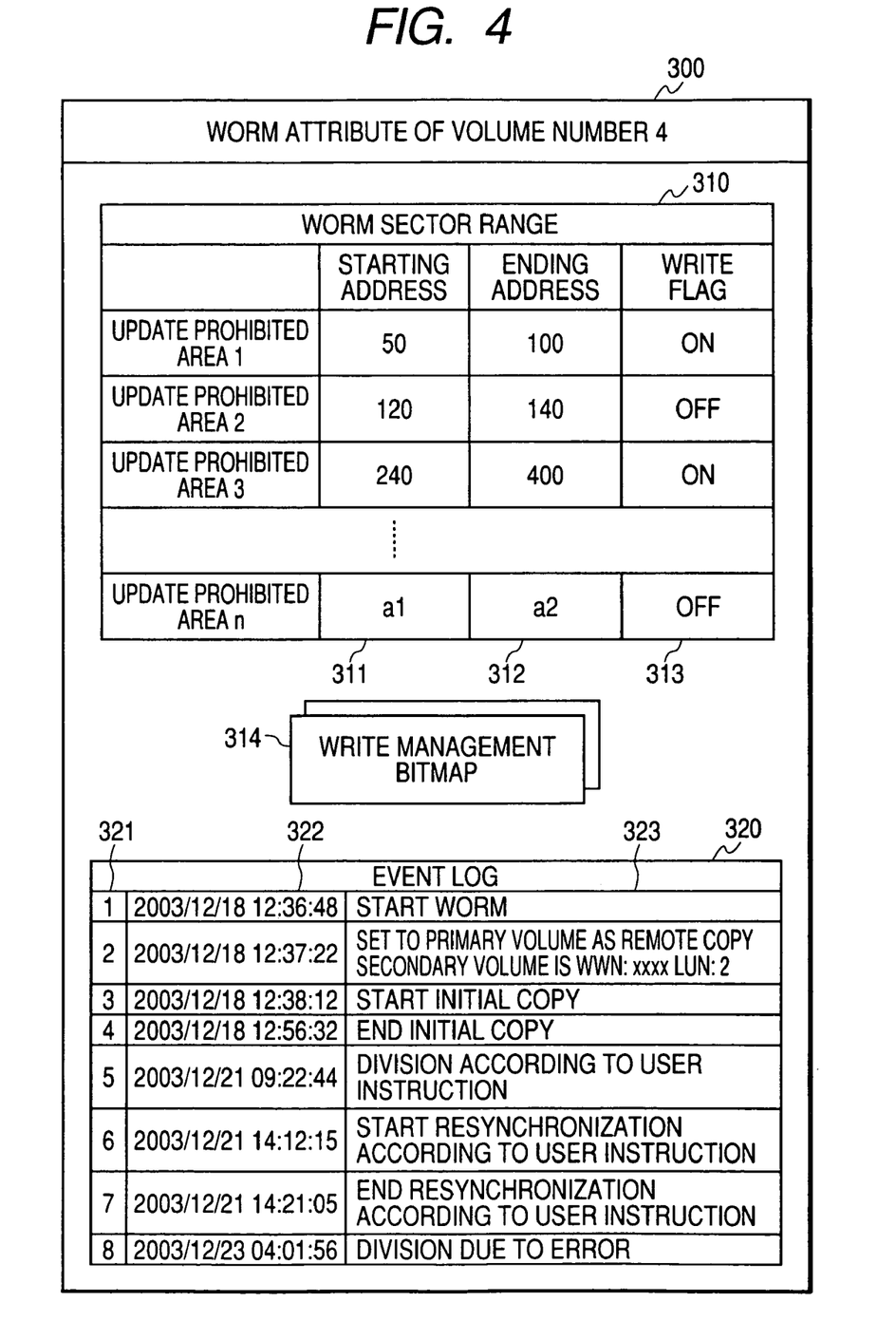
FIG. 4 is a diagram showing an example of a WORM attribute of a certain volume.

FIG. 4 is a diagram showing an example of a WORM attribute provided in the volume management information A 124 for each logical volume. The WORM attribute shown in FIG. 4 is attribute information of a volume, for which an I/O control type is WORM and a sector is designated as the WORM unit 204, among the volumes in FIG. 3.

A WORM sector range 310 included in the WORM attribute 300 includes plural pieces of information indicating an update prohibited area. The information indicating the update prohibiting area is constituted by a set of a starting address 311 and an ending address 312 and ON or OFF of a write flag 313. These pieces of information are designated by the management terminal 101 or the client 102. The write flag 313 indicates whether data can be written or updated once in the update prohibited area. ON indicates that data can be written or updated once in the update prohibited area, and OFF indicates that data cannot be written and updated in the update prohibited area. Moreover, in the case in which the write flag 313 is ON, the WORM attribute 300 has a write management bit map 314 corresponding to the update prohibited area and manages whether data is written or updated once in each sector in the update prohibited area using the write management bitmap 314. When data is written or updated once in all sectors in the update prohibited area designated by the starting address 311 and the ending address 312, the input/output processing program 116 switches the write flag to OFF.

Note that, in the case in which the I/O control type is WORM and a volume is designated as the WORM unit 204 in a volume among the volumes in FIG. 3, all storage areas of the volume are registered in the WORM sector range 310 in FIG. 4.

A log of events concerning remote copy is recorded in an event log 320 included in the WORM attribute 300. Here, the events concerning remote copy include, for example, transition of a remote copy state shown in FIG. 7. In addition, the event log includes, for example, a sequence number 321, an event occurrence time 322, and an event content 323.

Figure 5:
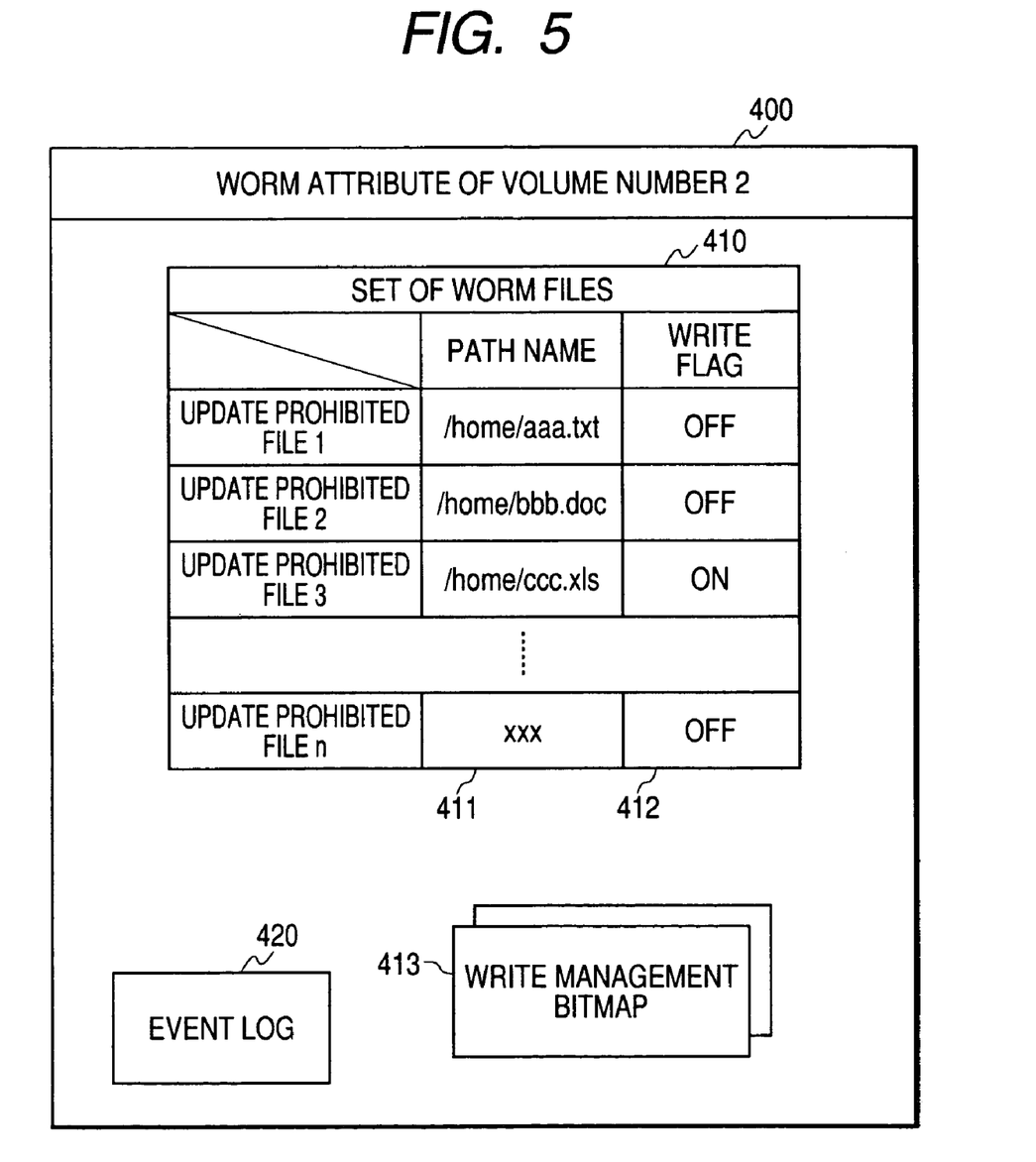
FIG. 5 is a diagram showing an example of a WORM attribute of a certain volume.

FIG. 5 is a diagram showing another example of the WORM attribute provided in the volume management information A 124 for each logical volume. The WORM attribute shown in FIG. 5 is attribute information of a volume, for which an I/O control type is WORM and a file is designated as the WORM unit 204, among the volumes in FIG. 3.

A set of WORM files 410 included in the WORM attribute 400 includes plural pieces of information indicating update prohibited files. The information indicating update prohibited files is constituted by a pathname 411 and ON or OFF of the write flag 412. These pieces of information are designated by the management terminal 101 or the client 102. The write flag 412 indicates whether data can be written or updated once in the file. ON indicates that data can be written or updated once in the file, and OFF indicates that data cannot be written or updated in the file. Moreover, in the case in which the write flag 412 is ON, the WORM attribute 400 has a write management bitmap 413 corresponding to a storage area, in which the file is stored, and manages whether data has been written or updated once in each sector in the storage area in which the file is stored. When data is written or updated once in all the sectors in the storage area, in which the file is stored, designated by a pathname, the input/output processing program 116 switches the write flag to OFF.

A log of events concerning remote copy is recorded in an event log 420 as in the event log 320 in FIG. 4.

Note that, in this embodiment, there are two type as a method of setting WORM for a volume.

In the type 1, WORM is set for a storage area in which data has already been written. After WORM is set, writing and update of data in the storage area are prohibited.

In the type 2, after WORM is set for a storage area, writing or update of data is permitted only once. However, after data is written or updated once, both writing and update of data in the storage area are prohibited.

Whether WORM is set by a method of the type 1 or the type 2 is determined by an instruction of the configuration management program 118 from the management terminal 101 or the client 102.

In the case in which WORM is set only by the method of the type 1, in all cases in which the WORM unit 204 is a sector, a volume, a file, and the like, a write flag and a write management bitmap are unnecessary.

Figure 6:
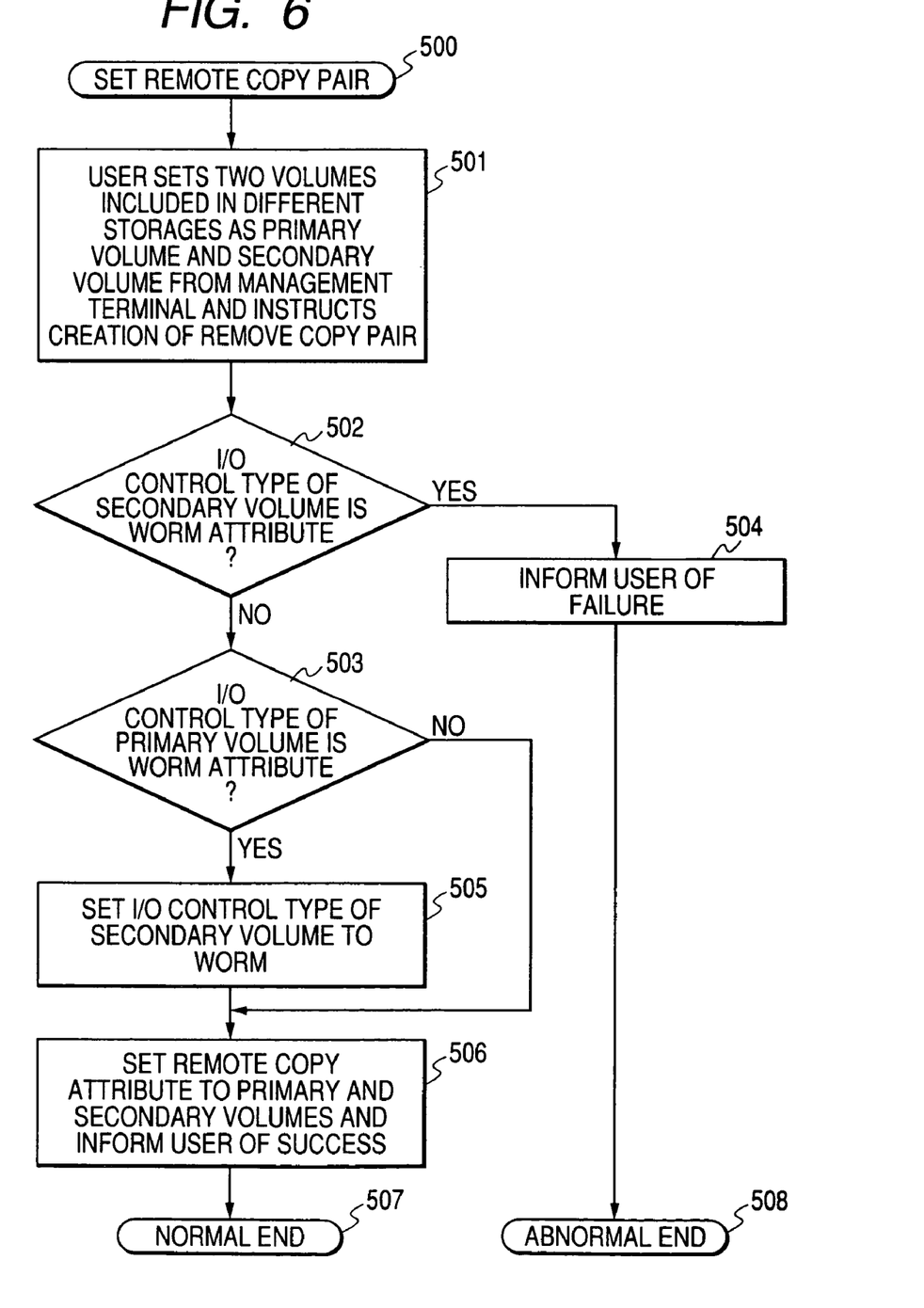
FIG. 6 is a flowchart showing an example of processing in which a configuration management program of a storage sets a remote copy pair.

FIG. 6 is a diagram showing an example of processing in which the management terminal 101 connected to the LAN 103 sets a remote copy pair for the storage system A 110 and the storage system B 111 in FIG. 1. Respective steps of remote copy pair setting 500 will be hereinafter explained.

In step 501, a user instructs the storage system A 110 and the storage system B 111 to form a remote copy pair from the management terminal 101. Designation by the user includes identification information for a volume in the storage system A 110 to be a primary volume and identification information for a volume in the storage system B 111 to be a secondary volume.

In step 502, the configuration management program 118 in the storage system B 111 judges whether the logical volume designated as the secondary volume has a WORM attribute with reference to the I/O control type 203 included in the volume management information B 124. If the logical volume designated as the secondary volume has the WORM attribute, in step 504, the configuration management program 118 informs the user of irregularity of the instruction, which leads to an abnormal end. This is because, if the secondary volume has the WORM attribute before remote copy is set, data copied from the primary volume may not be saved. If the logical volume designated as the secondary volume does not have the WORM attribute, the configuration management program 118 of the storage system B 111 informs the configuration management program 118 of the storage system A 110 that the logical volume designated as the secondary volume does not have the WORM attribute.

In step 503, the configuration management program 118 of the storage system A 110 judges whether the logical volume designated as the primary volume has the WORM attribute with reference to the I/O control type 203 included in the volume management information A 124. In the case in which the logical volume designated as the primary volume has the WORM attribute, in step 505, the configuration management program 118 of the storage system A 110 sets the I/O control type 203 of the secondary volume to WORM. In this case, the configuration management program 118 of the storage system A 110 having the primary volume communicates with the configuration management program 118 of the storage system B 111 having the secondary volume through the LAN 103 or the SAN 104 and instructs the latter to set the secondary volume to WORM. The configuration management program of the storage system B 111 sets the I/O control type 203 of the secondary volume to WORM according to the instruction from the configuration management program 118 of the storage system A 110. The configuration management program 118 of the storage system B 111 creates the WORM attribute 300 or 400, which corresponds to the volume designated as the secondary volume, on the basis of the WORM unit 204 of the primary volume and sets the WORM unit 204 in the same manner as the primary volume. Concerning a volume which is set to the attribute of WORM and for which the remote copy attribute 205 is secondary, only update processing for copying data from the primary volume is permitted, and update from the client 102 is prohibited.

In step 506, the respective configuration management programs 118 of the storage system A 110 and the storage system B 111 write IDs of the primary volume and the secondary volume, which are designated by the user in step 501, in the remote copy attribute 205. The respective configuration management programs 118 send completion of the remote copy pair setting to the management terminal, inform the user of the completion, and end the remote copy pair setting normally (step 507).

As described above, in the case in which a volume for which the WORM attribute is set is designated as the primary volume in the remote copy pair setting 500, the WORM attribute is automatically set for the secondary volume, whereby setting for a WORM remote copy pair can be performed automatically without drawing the user's attention.

In the above explanation, it is assumed that any one of the logical volumes in the storage system A 110 is designated as a primary volume and any one of the logical volumes in the storage system B 111 is designated as a secondary volume to set a remote copy pair. However, it is possible to assume that any one of the logical volumes in the storage system B 111 is set as a primary volume and any one of the logical volumes in the storage system A 110 is set as a secondary volume to set a remote copy pair in the same manner.

Figure 7:
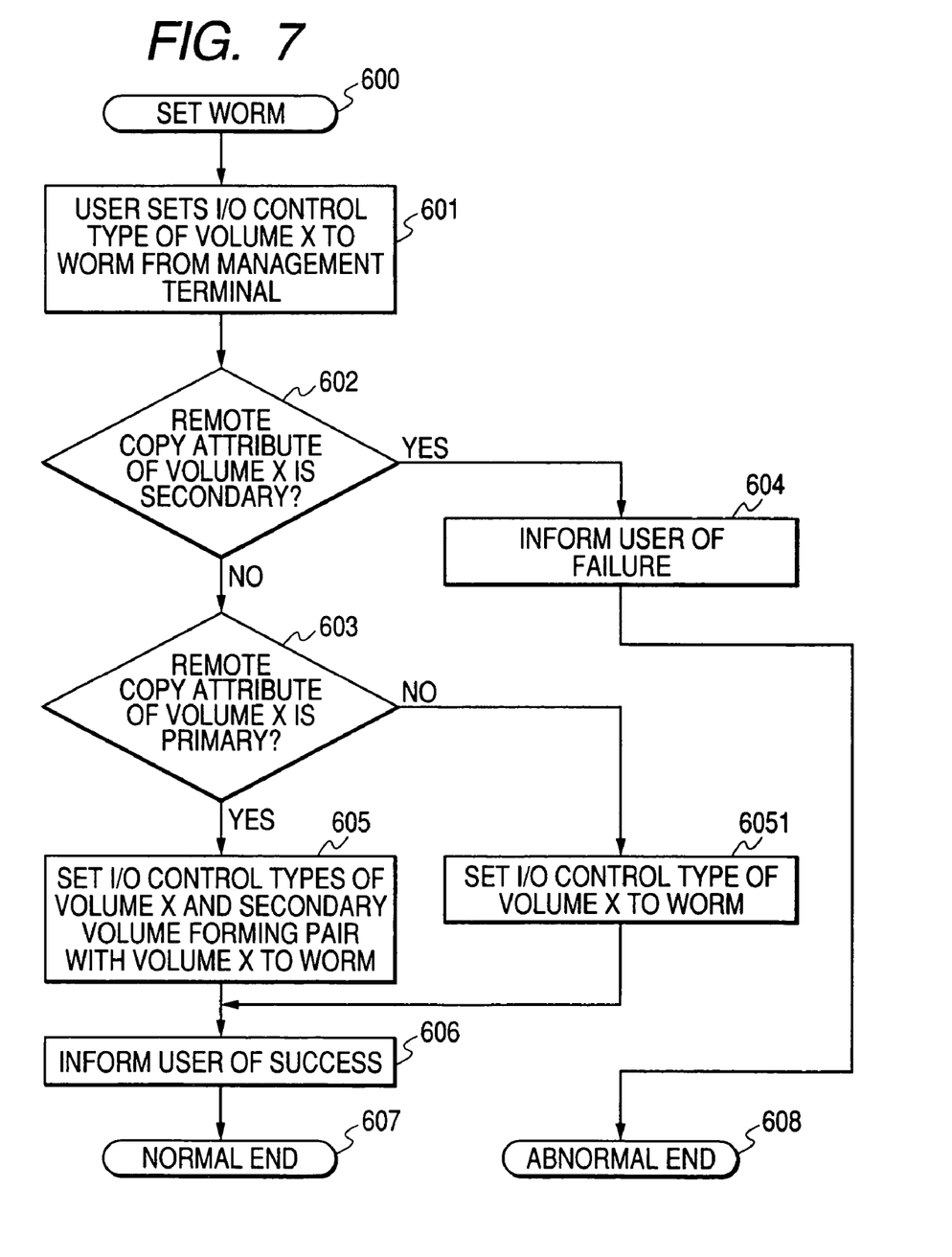
FIG. 7 is a flowchart showing an example of processing in which a configuration management program of a storage sets an I/O control type of a volume as WORM.

FIG. 7 is a diagram showing an example of WORM setting processing in which the management terminal 101 connected to the LAN 103 changes an I/O control type of a logical volume in the storage system A 110 to WORM. Processing for changing an I/O control type of a logical volume in the storage system B 111 to WORM can be executed in the same manner. Respective steps of WORM setting processing 600 will be hereinafter explained.

In step 601, a user designates a logical volume, for which an I/O control type is set to WORM, from the management terminal 101 and informs the configuration management program 118 of the storage system A 110 of the logical volume.

In step 602, the configuration management program 118 of the storage system A 110 in FIG. 1 judges whether the logical volume designated by the user is a secondary volume with reference to the remote copy attribute 205 of FIG. 3 included in the volume management table A 124. If a remote copy attribute of the logical volume is secondary, in step 604, the configuration management program 118 of the storage system A informs irregularity of the designation to the user, which leads to abnormal end. This is because, when only the secondary volume has a WORM attribute, data copied from a primary volume to the secondary volume cannot be saved in some cases.

If the remote copy attribute of the logical volume designated by the user is primary in step 603, in step 605, the configuration management program 118 of the storage system A 110 sets the I/O control type 203 of the logical volume designated by the user to WORM and sets the I/O control type 203 of a secondary volume, which forms a remote copy pair with the logical volume designated by the user, to WORM in the same manner as step 505 in FIG. 6. Consequently, the remote copy pair has been automatically changed to a WORM remote copy pair.

If the logical volume designated by the user does not form a remote copy pair in step 603, in step 6051, the configuration management program 118 of the storage system A 110 sets the I/O control type 203 of the logical volume designated by the user to WORM.

Note that, in the case in which the I/O control type 203 of a volume of a storage system is set to WORM, the configuration management program 118 of the storage system create the WORM attribute 300 or 400 corresponding to the volume for which the I/O control type 203 is set to WORM.

In step 606, the control management program 118 of the storage system A 110 informs the user of completion of the WORM setting and normally ends the WORM setting (step 607).

In the case in which the primary volume of the remote copy pair is set to WORM in the WORM setting 600, the WORM attribute is automatically set also in the secondary volume, whereby the remote copy pair is automatically changed to a WORM remote copy pair without drawing attention of the user.

Next, an event log, which is recorded in the WORM attribute shown in FIG. 4 or 5, will be explained. Concerning processing for setting WORM for a volume and processing for receiving instruction for setting a remote copy pair form the client 102 or the management terminal 101 to execute the instruction, the configuration management program 118 creates an event log and records the event log in the WORM attribute. For example, when the configuration management program 118 of the storage system A 110 is instructed by the client 102 or the management terminal 101 to copy data of a primary volume to a secondary volume in the storage system B 111 and executes the instruction, the configuration management program 118 of the storage system A 110 creates an event log to that effect and stores the event log in the volume management information A 124.

Moreover, in the case in which a volume, which is an object of recording of an event log, forms a pair, the configuration management program 118 of the storage system A 110 instructs the configuration management program 118 of the storage system B 111 to store the event log, which is created by the configuration management program 118 of the storage system A 110, in the volume management information B. By performing such processing, consistency of event logs stored in WORM attributes corresponding to the primary and secondary volumes, which form a remote copy pair, is kept.

Figure 8:
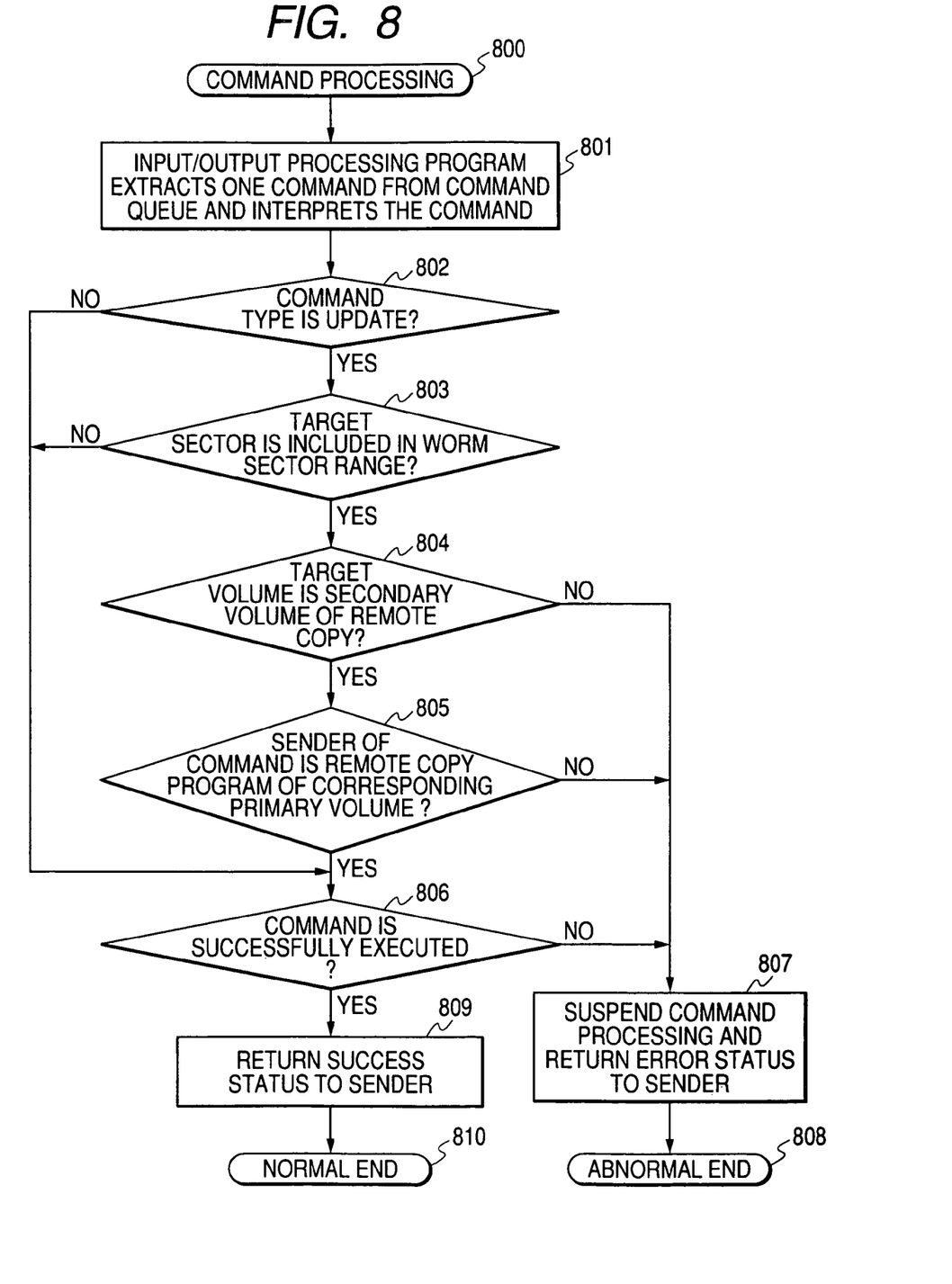
FIG. 8 is a flowchart showing an example of command processing.

FIG. 8 is a flowchart showing an example of processing in the case in which the client 102 has issued a write request for a logical volume to the storage system A 110. Here, command processing 800 will be explained with a case in which a WORM unit is a sector as an example. First, the command processing 800 will be explained with a case in which WORM is set by the method of the type 1 as an example.

In step 801, the input/output processing program 116 extracts one command among commands, which are sent from the client 102 and stored in a command queue on the memory 115, from the command queue.

In step 802, the input/output processing program 116 judges whether the command is a command for updating a sector on a basis of a field indicating the type of a command. If the command is a command for updating a sector, the input/output processing program 116 shifts to step 803. If the command is a command not for updating a sector such as a command for reading, the input/output processing program 116 shifts to step 806.

In step 803, the input/output processing program 116 judges whether a sector, which is an object of the command, is included in the WORM sector range 310 with reference to the WORM attribute 300 of FIG. 4 for a volume, which is an object of the command. If the sector is included in the WORM sector range 310, the input/output processing program 116 shifts to step 804. If the sector is not included in the WORM sector range 310, the input/output processing program 116 shifts to step 806.

In step 804, the input/output processing program 116 judges whether the volume is a secondary volume of a remote copy pair with reference to the remote copy attribute 205 of FIG. 2 for the volume, which is an object of the command. If the volume is a secondary volume of a remote copy pair, the input/output processing program 116 shifts to step 805. If the volume is not a secondary volume of a remote copy pair, the input/output processing program 116 judges that the command is an irregular update command for an update prohibited sector and shifts to step 807.

In step 805, the input/output processing program 116 judges whether the command is a command generated by remote copy from a primary volume forming the remote copy pair.

As a method for the judgment, there is a method of using an identifier of a SAN I/F of an apparatus that has issued the command. For example, in the case of the Fibre Channel, each I/F has an identifier called a WWN (World Wide Name). Similar identifiers are present in the other network systems. The command includes an area in which the identifier of the SAN I/F of the apparatus that has issued the command. The configuration management program 118 of FIG. 1 records a WWN of the I/F 112 of the storage system A 110 having the primary volume 122 in the volume management information B 125 when the configuration management program 118 sets a remote copy pair. In step 805, the input/output processing program 116 can compare the identifier stored in the command and the identifier recorded in the volume management information B 125 and judge whether the update command for the secondary volume is a command generated by remote copy from the primary volume.

As another method, a method of adding a code indicating that a command is a regular remote copy command when the remote copy program 117 of a storage system having a primary volume sends the command to a remote copy program of a storage system having a secondary volume is possible. As a technique for proving that data is sent from a correct sender, a message authentication code and the like are known.

If it is judged in step 805 that the command is judged as a regular remote copy command, the input/output processing program 116 shifts to step 806. If it is judged in step 805 that the command is not a regular remote copy command, the input/output processing program 116 shifts to step 807. In step 806, the input/output processing program 116 executes normal command processing; If there is no failure in the apparatus, abnormality of the command, or the like, the input/output processing program 116 executes step 809 to normally end the command processing (810). In step 807, the command processing ends abnormally (808).

Next, a difference between a case in which WORM is set by the method of the type 1 and the case in which WORM is set by the method of the type 2 will be explained. After it is judged in step 804 that the volume is not a secondary volume of a remote copy pair, the input/output processing program 116 judges whether a write flag of a sector, for which data is about to be updated, is ON with reference to the WORM attribute 300. If the write flag is ON, the input/output processing program 116 judges whether data has been written once in the sector, for which data is about to be updated, with reference to a bitmap of the sector. If data has not been written in the sector once, the input/output processing program 116 shifts to step 806. Regardless of the write flag being ON or OFF, when input/output processing program 116 judges data has been written once in the sector, for which data is about to be updated, with reference to a bit map of the sector, the input/output processing program 116 proceeds to step 807.

In addition, a program for adding an electronic signature or a message authentication code, which can be generated by only a storage system having a primary volume, to copy data to be sent from the primary volume to a secondary volume, a program for verifying the electronic signature or the message authentication code added to the copy data in a storage system having the secondary volume, and a program for prohibiting update of the secondary volume according to the copy data if authentication fails on the basis of the verification of the electronic signature or the message authentication code are added to the remote copy program 117. Consequently, control can be performed surely such that data in the secondary volume of the WORM remote copy pair is not updated according to irregular data other than the copy data of the data stored in the primary volume from the storage system having the primary volume.

Figure 9:
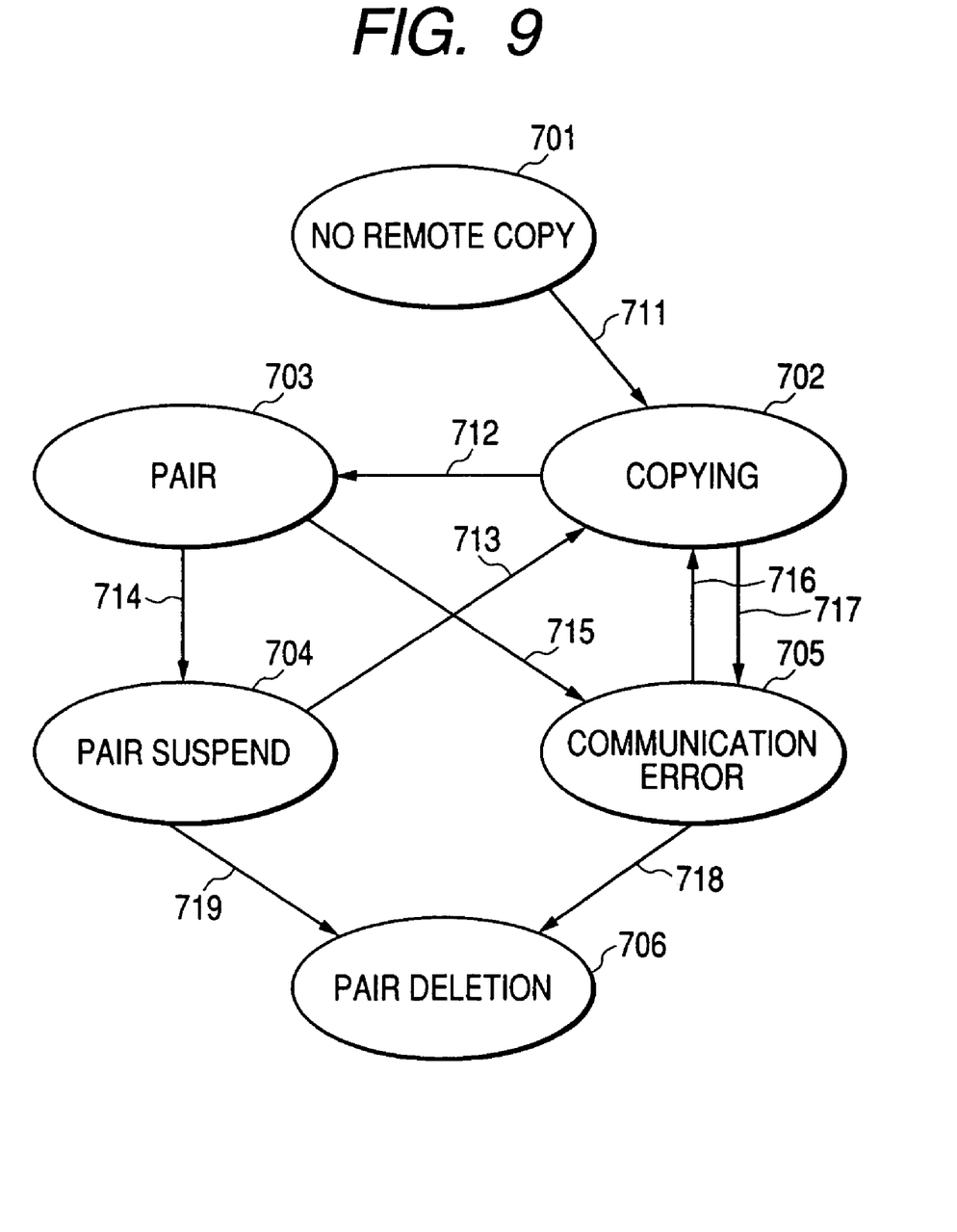
FIG. 9 is a diagram showing an example of state transition in remote copy.

FIG. 9 is a diagram showing an example of transition of the remote copy state 206 of the volume management table A 224 in FIG. 3.

In the remote copy state 206, no remote copy, copying, pair, pair suspend, communication error, or pair deletion is set.

No remote copy indicates a state in which a pertinent volume is a volume not forming a remote copy pair (state 701).

Copying indicates a state in which data of a primary volume is being copied to a secondary volume in order to make data of the secondary volume identical with that in the primary volume (state 702). In the state 702, in the primary volume and the secondary volume, not only data but also WORM attributes of both the volumes are made identical. The WORM attribute 300 or 400 of the primary volume is sent from the storage system A 110 to the storage system B 111 by the remote copy program 117 and copied to the WORM attribute 300 or 400 of the secondary volume.

Pair indicates a state in which update of data according to a write request for the primary volume from the client 102 is also executed for the secondary volume (state 703). In addition, in the state 703, not only the update of data according to the write request to the storage system A 110 from the client 102 but also the update of the WORM attribute for the primary volume is executed for the secondary volume. Moreover, in this case, the management terminal 101 or the client 102 instructs the storage system A 110, which has the primary volume, and the storage system B 111, which has the secondary volume corresponding to the primary volume, to switch an operation of the primary and the secondary volumes, whereby an operation of a volume can be switched.

Pair suspend indicates a state in which the update of data according to the write request for the primary volume from the client 102 is not executed for the secondary volume (state 704).

Communication error indicates a state in which a communication failure or a failure in any one of storages forming a WORM remote copy pair has occurred (state 705).

Pair deletion indicates a state in which a remote copy pair is deleted (state 706).

Next, a transition process from one state to another will be explained.

Transition from the state 701 to the state 702 is performed by the remote copy pair setting 500 shown in FIG. 6 (transition 711). Copy of data from the primary volume to the secondary volume, which is executed for forming a remote copy pair in the transition 711, is referred to as initial copy.

When the copy from the primary volume to the secondary volume is completed in the state 702, the remote copy state 206 transits to the state 703 (transition 712). When a communication failure or the like occurs while data is copied from the primary volume to the secondary volume and the copy cannot be continued in the state 702, the remote copy state 206 transits to the state 705 (transition 717).

In the state 703, the management terminal 101 or the client 102 instructs the storage system A 110 not to execute update of data for the secondary volume, whereby the remote copy state 206 transits to the state 704 (transition 714). In addition, in the state 703, when a communication failure or the like occurs and the remote copy pair cannot be continued, the remote copy state 206 transits to the state 705 (transition 715).

In the state 704, the management terminal 101 or the client 102 instructs the storage system A 110 to copy data of the primary volume to the secondary volume, whereby the remote copy state 206 transits to the state 702 (transition 713). In the transition 713, in order to reflect the update of the data executed for the primary volume during the pair suspend (state 704) on the secondary volume, updated data stored in the primary volume during the pair suspend is copied to the secondary volume. Processing for making the data of the primary volume and the data of the secondary volume identical through this copy processing is referred to as resynchronization. The resynchronization includes processing for making the WORM attribute 300 or 400 of the primary volume and that of the secondary volume identical. In addition, the management terminal 101 or the client 102 instructs the storage system A 110 to delete the remote copy pair, whereby the remote copy state 206 transits to the state 706 (transition 719).

When an error factor is eliminated in the state 705, the remote copy state 206 transits to the state 702 (transition 716). In the transition 716, in order to reflect the update of the data executed for the primary volume during the communication error (state 705) on the secondary volume, updated data stored in the primary volume during the communication error is copied to the secondary volume. Processing for making the data of the primary volume and the data of the secondary volume identical through this copy processing is referred to as resynchronization. The resynchronization includes processing for making the WORM attribute 300 or 400 of the primary volume and that of the secondary volume identical. In addition, the management terminal 101 or the client 102 instructs the storage system A 110 to delete the remote copy pair, whereby the remote copy state 206 transits from the state 705 to the state 706 (transition 718).

When the remote copy state 206 has transited to the state 706, the remote copy attributes 205 and the remote copy states 206 corresponding to both the volumes forming the WORM remote copy pair change to "none". In addition, the I/O control types 203 of both the volumes change to WORM. When the remote copy state 206 has transited to the state 706, if the remote copy state 206 has transited to the state 703 at least once to that point, the WORM attribute and the data of the primary volume have been transferred to the secondary volume, although not completely. The data stored in the primary volume and the WORM attribute set in the primary volume at the point when the remote copy state 206 transited to the state 704 through the transition 714 finally or at the point when the remote copy state 206 transited to the state 705 through the transition 715 are transferred to the secondary volume. However, transfer of the data and the WORM attribute after that point is not guaranteed. It can be confirmed to which point the data and the WORM attribute have been transferred with reference to the event log 320 (FIG. 4) or the event log 420 (FIG. 5) of the volume that has been the secondary volume. The I/O control types of both the volumes after the pair deletion, which have been the primary volume and the secondary volume, are WORM. Thus, the WORM remote copy pair cannot be formed again according to the restriction described in the explanation of the remote copy pair setting 500 in FIG. 6.

In this embodiment, the data to be stored in the volume designated as the primary volume, for which the I/O control type is WORM, is initially copied in the state 702, and the I/O control type of the volume designated as the secondary volume is set to WORM. In addition, in the mirror in the state 703 and the resynchronization in the state 702, update of data in the secondary volume by means other than the remote copy program is prohibited to prevent illegal falsification. This realizes the WORM remote copy that can impart the same character as in the primary volume, which makes it possible to prove that data recorded initially has not been falsified, to the secondary volume.

In addition, by replacing the secondary volume with the primary volume in the state 703, the operation of the system can be continued using the logical volume, which was the secondary volume before the replacement, while maintaining a non-falsification proving capability equivalent to that of the logical volume which was the primary volume before the replacement.

Further, in the case in which identity of the primary volume and the secondary volume cannot be kept due to a failure in the storage having the primary volume or a failure in a communication path for performing remote copy, by recording state transition of the remote copy in the event log 320 or 420 (FIG. 4 or 5) included in the WORM attribute, it can be proved that the data and the WORM attribute of the primary volume up to a certain point, for which a record remains in the log, are recorded in the secondary volume. Thus, the operation of the system can be continued using the secondary volume. As described in the explanation of the remote copy pair setting 500 in FIG. 6, the configuration management program 118 in FIG. 1 judges whether the logical volume designated as the primary volume is WORM or not using the I/O control type of the volume for which remote copy pair formation is instructed, whereby a WORM remote copy pair can be formed automatically.

Moreover, as described in the explanation of the WORM setting 600 in FIG. 7, the configuration management program 118 of FIG. 1 judges a remote copy attribute of a logical volume, for which the configuration management program 118 is instructed to change the I/O control type to WORM, whereby a WORM remote copy pair can be formed automatically.

In this embodiment, the logical volume is illustrated as an object of remote copy. However, the same method as this embodiment is applicable to remote copy targeting a physical volume, a directory or a file in a file system, and the like in order to realize WORM.

What is claimed is:

1. A system comprising:
a first storage system that includes a first storage and a first control apparatus for controlling the first storage; and
a second storage system that includes a second storage and a second control apparatus for controlling the second storage,
wherein the first storage system and the second storage system are connected,
each of the first storage and the second storage includes a volume to which one of an attribute to the effect that data can be referred to and can be updated and an attribute to the effect that data can be referred to but cannot be updated is added,
the first control apparatus receives designation of a primary volume,
the second control apparatus receives designation of a secondary volume in which a copy of data to be stored in the primary volume is stored, and
the first control apparatus judges whether the attribute to the effect that data can be referred to and can be updated or the attribute to the effect that data can be referred to but cannot be updated is added to the volume designated as the primary volume, and if the volume designated as the primary volume is a volume to which the attribute to the effect that data can be referred to but cannot be updated is added, the first control apparatus instructs the second control apparatus to add the attribute to the effect that data can be referred to but cannot be updated to the volume designated as the secondary volume.

2. A system of claim 1,
wherein the second control apparatus judges whether the attribute to the effect that data can be referred to and can be updated or the attribute to the effect that data can be referred to but cannot be updated is added to the volume designated as the secondary volume, and if the volume designated as the secondary volume is a volume to which the attribute to the effect that data can be referred to but cannot be updated is added, the second control apparatus outputs a notice to the effect that designation of the volume as the secondary volume cannot be accepted.

3. A system of claim 1,
wherein each of the first storage system and the second storage system manages whether a volume in the first storage or the second storage is a primary volume or a secondary volume, or neither a primary volume nor a secondary volume, and is a volume to which the attribute to the effect that data can be referred to and can be updated is added or a volume to which the attribute to the effect that data can be referred to but cannot be updated is added.

4. A system of claim 3,
wherein each of the first storage system and the second storage system has volume management information that records whether a volume in the first storage or the second storage is a primary volume or a secondary volume, or neither a primary volume nor a secondary volume, and is a volume to which the attribute to the effect that data can be referred to and can be updated is added or a volume to which the attribute to the effect that data can be referred to but cannot be updated is added.

5. A system of claim 4,
wherein each of the first control apparatus and the second control apparatus rewrites the volume management information when receiving designation of the primary volume or designation of the secondary volume or being instructed to add the attribute to the effect that data can be referred to but cannot be updated to the volume.

6. A system of claim 4,
wherein, concerning a volume to which the attribute to the effect that data can be referred to but cannot be updated is added, the volume management information further records a unit to which the attribute to the effect that data can be referred to but cannot be updated is added in a storage area in the volume.

7. A system of claim 6,
wherein each of the first control apparatus and the second control apparatus manages for each unit in the volume whether a storage area is a storage area having the attribute to the effect that data can be referred to but cannot be updated or a storage area having the attribute to the effect that data can be referred to and can be updated.

8. A system of claim 7,
wherein the unit is a part of the storage area in the volume.

9. A system of claim 7,
wherein the unit is a file stored in the volume.

10. A system of claim 1,
wherein the second control apparatus receives update from the first control apparatus with respect to the volume that is designated as the secondary volume and to which the attribute to the effect that data can be referred to but cannot be updated is added.

11. A system of claim 1,
wherein the first control apparatus receives designation of a volume to which the attribute to the effect that data can be referred to but cannot be updated is added, and in the case in which the designated volume is set as the secondary volume, the first control apparatus outputs a notice to the effect that the designation cannot be accepted.

12. A system of claim 11,
wherein the first control apparatus instructs the second control apparatus to add the attribute to the effect that data can be referred to but cannot be updated to the secondary volume, which is a copy destination of data to be stored in the designated volume, in the case in which the designated volume is set as the primary volume.

13. A system of claim 1,
wherein the first control apparatus keeps record of processing, which is executed for a volume to be stored in the first storage, from a point when the attribute to the effect that data can be referred to but cannot be updated is set to the volume to be stored in the first storage, and in the case in which the volume is designated as the primary volume, the first control apparatus sends the record of the processing to the second control apparatus, which is executed for the volume to be stored in the first storage.

14. A computer program product for a first storage system, which includes a first storage and a first control apparatus for controlling the first storage, and a second storage system, which includes a second storage and a second control apparatus for controlling the second storage and is connected to the first storage system, comprising:
  a code that is used by the first storage system to receive designation of a primary volume;
  a code that is used by the second storage system to receive designation of a secondary volume in which a copy of data, which is stored in a volume to be designated as the primary volume, is stored;
  a code for judging whether an attribute to the effect that data can be referred and updated or an attribute to the effect that data can be referred to but cannot be updated is added to the volume designated as the primary volume;
  a code for adding the attribute to the effect that data can be referred to but cannot be updated to a volume to be designated as the secondary volume in the case in which the volume designated as the primary volume is a volume of the attribute to the effect that data can be referred to but cannot be updated; and
  a computer readable storage medium for storing the codes.

15. A computer program product of claim 14, further comprising:
  a code for judging whether the attribute to the effect that data can be referred to and can be updated or the attribute to the effect that data can be referred to but cannot be updated is added to the volume designated as the secondary volume; and
  a code for outputting a notice to the effect that designation of the secondary volume cannot be accepted in the case in which the volume designated as the secondary volume is a volume of the attribute to the effect that data can be referred to but cannot be updated.

16. A computer program product of claim 14, further comprising:
  a code for receiving designation of a volume, to which the attribute to the effect that data can be referred to but cannot be updated is added, among volumes in the first storage; and
  a code for outputting a notice to the effect that the attribute to the effect that data can be referred to but cannot be updated cannot be added to the designated volume in the case in which the designated volume is set as the secondary volume.

17. A computer program product of claim 16, further comprising:
  a code for adding the attribute to the effect that data can be referred to but cannot be updated to the secondary volume, which is a copy destination of data stored in the designated volume, in the case in which the volume designated as a volume to which the attribute to the effect that data can be referred to but cannot be updated is added is a volume set as the primary volume.

18. A system comprising:
  a management terminal;
  a first storage system that includes a first storage and a first control apparatus for controlling the first storage; and
  a second storage system that includes a second storage and a second control apparatus for controlling the second storage,
  wherein the first storage system and the second storage system are connected,
  each of the first storage and the second storage includes a volume to which one of an attribute to the effect that data can be referred to and can be updated and an attribute to the effect that data can be referred to but cannot be updated is added,
  the management terminal designates a primary volume in the first control apparatus and designates a secondary volume, in which a copy of data to be stored in the primary volume is stored, in the second control apparatus, and
  the first control apparatus judges whether the attribute to the effect that data can be referred to and can be updated or the attribute to the effect that data can be referred to but cannot be updated is added to the volume designated as the primary volume, and if the volume designated as the primary volume is a volume of the attribute to the effect that data can be referred to but cannot be updated, the first control apparatus instructs the second control apparatus to add the attribute to the effect that data can be referred to but cannot be updated to the volume designated as the secondary volume.

19. A system of claim 18,
wherein the second control apparatus judges whether the attribute to the effect that data can be referred to and can be updated or the attribute to the effect that data can be referred to but cannot be updated is added to the volume designated as the secondary volume, and if the volume designated as the secondary volume is a volume to which the attribute to the effect that data can be referred to but cannot be updated is added, the second control apparatus notifies the management terminal that designation of the volume as the secondary volume cannot be accepted.

20. A system of claim 18,
wherein the management terminal designates a volume, to which the attribute to the effect that data can be referred to but cannot be updated, among volumes in the first storage, and
the first control apparatus notifies the management terminal that the designation cannot be accepted in the case in which the designated volume is the secondary volume, and instructs the second control apparatus to add the attribute to the effect that data can be referred to but cannot be updated to the secondary volume, which is a copy destination of data to be stored in the designated volume, in the case in which the designated volume is the primary volume.

* * * * *